US012808345B2

(12) United States Patent
Usui et al.

(10) Patent No.: US 12,808,345 B2
(45) Date of Patent: Nov. 24, 2026

(54) FUEL PUMP

(71) Applicant: Hitachi Astemo, Ltd., Hitachinaka (JP)

(72) Inventors: Satoshi Usui, Hitachinaka (JP); Masashi Nemoto, Hitachinaka (JP); Kiyotaka Ogura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 19/104,583

(22) PCT Filed: Oct. 18, 2022

(86) PCT No.: PCT/JP2022/038707

§ 371 (c)(1),
(2) Date: Feb. 18, 2025

(87) PCT Pub. No.: WO2024/084567

PCT Pub. Date: Apr. 25, 2024

(65) Prior Publication Data

US 2026/0055751 A1 Feb. 26, 2026

(51) Int. Cl.
*F02M 59/46* (2006.01)
*F02M 59/36* (2006.01)
(Continued)

(52) U.S. Cl.
CPC ........ *F02M 59/466* (2013.01); *F02M 59/366* (2013.01); *F04B 17/04* (2013.01); *F16K 31/0675* (2013.01); *F16K 31/0689* (2013.01)

(58) Field of Classification Search
None
See application file for complete search history.

(56) References Cited

U.S. PATENT DOCUMENTS 10,968,877 B2 4/2021 Cichon et al.
2020/0182210 A1* 6/2020 Kodama ............. F02M 59/466
(Continued)

FOREIGN PATENT DOCUMENTS

JP 2003-314738 A 11/2003
JP 2012-154295 A 8/2012
(Continued)

OTHER PUBLICATIONS

International Search Report (PCT/ISA/210) issued in PCT Application No. PCT/JP2022/038707 dated Dec. 20, 2022 with English translation (4 pages).
(Continued)

*Primary Examiner* — Atif H Chaudry
(74) *Attorney, Agent, or Firm* — Crowell & Moring LLP

(57) ABSTRACT

A fuel pump includes an electromagnetic intake valve including a coil winding portion formed by winding an electromagnetic coil around a bobbin and a magnetic circuit configuration portion constituting a magnetic circuit when a current flows through the electromagnetic coil. The magnetic circuit configuration portion includes a yoke disposed so as to surround the coil winding portion, and a predetermined part facing, across a gap, the coil winding portion in a radial direction of the electromagnetic intake valve. The dimension of the gap is set such that the coil winding portion and the predetermined part come into contact with each other first when an impact force directed from an outer side to an inner side in the radial direction of the electromagnetic intake valve is applied to the yoke or the coil winding portion.

5 Claims, 7 Drawing Sheets

(51) Int. Cl.
*F04B 17/04* (2006.01)
*F16K 31/06* (2006.01)

(56) References Cited

U.S. PATENT DOCUMENTS

| | | | |
|---|---|---|---|
| 2020/0248663 | A1 | 8/2020 | Tokuo et al. |
| 2023/0124370 | A1 | 4/2023 | Ishihara et al. |

FOREIGN PATENT DOCUMENTS

| | | | |
|---|---|---|---|
| JP | 2021-14791 | A | 2/2021 |
| WO | WO 2018/221158 | A1 | 12/2018 |
| WO | WO 2022/004431 | A1 | 1/2022 |

OTHER PUBLICATIONS

Japanese-language Written Opinion (PCT/ISA/237) issued in PCT Application No. PCT/JP2022/038707 dated Dec. 20, 2022 with English translation (7 pages).
Extended European Search Report issued in European Application No. 22962679.1 dated Apr. 9, 2026 (7 pages).

* cited by examiner

FUEL PUMP

TECHNICAL FIELD

The present invention relates to a fuel pump.

BACKGROUND ART

In an internal combustion engine (engine) of an automobile or the like, a fuel pump including an electromagnetic intake valve that discharges fuel of a desired flow rate by increasing the pressure of the fuel is widely used (see, for example, PTL 1). The fuel pump described in PTL 1 includes a pump body, a cylinder forming a pressurization chamber, a plunger slidably held by the cylinder, and a discharge valve mechanism, in addition to an intake valve portion constituting an electromagnetic intake valve, a magnetic circuit configuration portion, and a coil winding portion.

When the engine is mounted with the fuel pump, the magnetic circuit configuration portion and the coil winding portion, which are parts of the electromagnetic intake valve, are disposed in a state of protruding outward from the pump body. Therefore, for example, when a traffic accident involving a collision of an automobile or the like occurs, a solenoid mechanism portion and a coil portion are applied with an impact force (impact load). The magnitude of the impact force is assumed in advance by a collision test, simulation, or the like, and the dimension of each part of the fuel pump are set based on this assumption.

CITATION LIST

Patent Literature

PTL 1: WO 2018/221158 A

SUMMARY OF INVENTION

Technical Problem

However, in order to achieve a fuel pump with higher safety, it is desirable to take structural measures in advance so that the components of the electromagnetic intake valve are not damaged even if an impact force having a magnitude more than assumed is applied to the yoke or the like.

An object of the present invention is to provide a fuel pump that can effectively suppress occurrence of damage to components of an electromagnetic intake valve even when an impact force is applied to a coil winding portion and a magnetic circuit configuration portion constituting the electromagnetic intake valve.

Solution to Problem

In order to solve the above problem, for example, the configuration described in the claims is adopted.

The present application includes a plurality of means for solving the above problem, and one of them is a fuel pump including an electromagnetic intake valve including a coil winding portion formed by winding an electromagnetic coil around a bobbin and a magnetic circuit configuration portion constituting a magnetic circuit when a current flows through the electromagnetic coil. The magnetic circuit configuration portion includes a yoke disposed so as to surround the coil winding portion, and a predetermined part facing, across a gap, the coil winding portion in a radial direction of the electromagnetic intake valve. The dimension of the gap is set such that the coil winding portion and the predetermined part come into contact with each other first when an impact force directed from an outer side to an inner side in the radial direction of the electromagnetic intake valve is applied to the yoke or the coil winding portion.

Advantageous Effects of Invention

According to the present invention, it is possible to effectively suppress occurrence of damage to components of an electromagnetic intake valve even when an impact force is applied to a coil winding portion and a magnetic circuit configuration portion constituting the electromagnetic intake valve.

Problems, configurations, and effects other than those described above will be clarified by the following description of embodiments.

DESCRIPTION OF EMBODIMENTS

An embodiment of the present invention will be described below in detail with reference to the drawings. In the present description and the drawings, elements having substantially the same function or configuration are denoted by the same reference signs, and redundant description will be omitted.

Fuel Supply System

Figure 1:
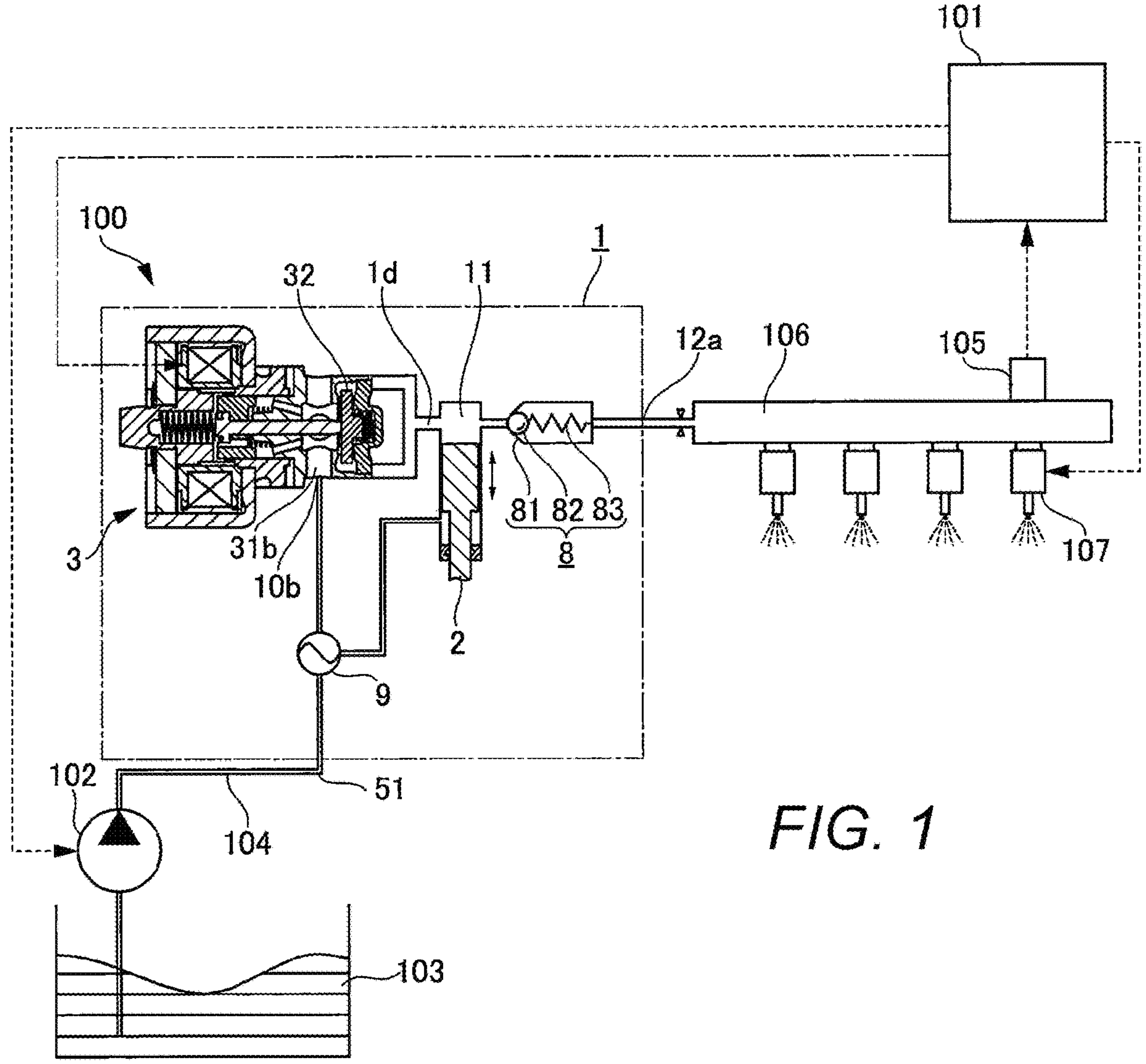
FIG. 1 is an overall configuration diagram of a fuel supply system using a fuel pump according to the present embodiment.

FIG. 1 is an overall configuration diagram of a fuel supply system using a fuel pump according to the present embodiment.

As illustrated in FIG. 1, the fuel supply system includes a high-pressure fuel supply pump 100 as a fuel pump, an engine control unit (ECU) 101, a fuel tank 103, a common rail 106, and a plurality of injectors 107. The components of the high-pressure fuel supply pump 100 are integrally incorporated in a pump body 1.

Fuel is stored in the fuel tank 103. The fuel in the fuel tank 103 is pumped up by a feed pump 102. The feed pump 102 pumps up fuel by being driven based on a signal sent from the ECU 101 to the feed pump 102. The fuel pumped up by the feed pump 102 is pressurized to an appropriate pressure by a pressure regulator not illustrated, and is sent to a low-pressure fuel intake port 51 of the high-pressure fuel supply pump 100 through a low-pressure pipe 104.

The high-pressure fuel supply pump 100 pressurizes and pumps, to the common rail 106, the fuel supplied from the fuel tank 103 by driving of the feed pump 102. The common rail 106 is mounted with a fuel pressure sensor 105 and the plurality of injectors 107.

The fuel pressure sensor 105 detects the pressure of fuel and outputs the detected pressure data to the ECU 101. The ECU 101 calculates an appropriate injection fuel amount (target injection fuel length), an appropriate fuel pressure (target fuel pressure), and the like based on engine state quantities (e.g., a crank rotation angle, a throttle opening, an engine speed, a fuel pressure, and the like) obtained from various sensors.

The plurality of injectors 107 are mounted in accordance with the number of cylinders (combustion chambers), and inject fuel according to a drive current output from the ECU 101. The fuel supply system of the present embodiment is what is called a direct injection engine system in which the injectors 107 directly inject fuel into a cylinder of the engine.

The ECU 101 controls driving of the high-pressure fuel supply pump 100 and the plurality of injectors 107 based on a calculation result such as fuel pressure (target fuel pressure). That is, the ECU 101 has a function as a pump control unit that controls the high-pressure fuel supply pump 100 and a function as an injector control unit that controls the injectors 107.

The high-pressure fuel supply pump 100 includes a pressure pulsation reduction mechanism 9, an electromagnetic intake valve 3, which is a variable capacity mechanism, a relief valve 4 (FIG. 2), and a discharge valve 8. The fuel flowing in from the low-pressure fuel intake port 51 reaches an intake port 31*b* of the electromagnetic intake valve 3 through the pressure pulsation reduction mechanism 9 and an intake passage 10*b*.

The fuel flowing into the electromagnetic intake valve 3 passes through a valve portion 32 and then flows into a pressurization chamber 11 through an intake passage 1*d* formed at the pump body 1. A plunger 2 is reciprocably inserted into the pressurization chamber 11. Power is transmitted to the plunger 2 by a cam 91 (FIG. 2) of the engine, and the plunger 2 reciprocates.

In the pressurization chamber 11, fuel is taken in from the electromagnetic intake valve 3 in a downward stroke of the plunger 2, and the fuel is pressurized in an upward stroke. When the fuel pressure in the pressurization chamber 11 exceeds a predetermined value due to this pressurization, the discharge valve 8 is opened. By this, the high-pressure fuel is sent to the common rail 106 through a discharge passage 12*a*. The fuel discharge by the high-pressure fuel supply pump 100 is operated by opening and closing of the electromagnetic intake valve 3. The opening and closing of the electromagnetic intake valve 3 is controlled by the ECU 101.

High-Pressure Fuel Supply Pump

Figure 2:
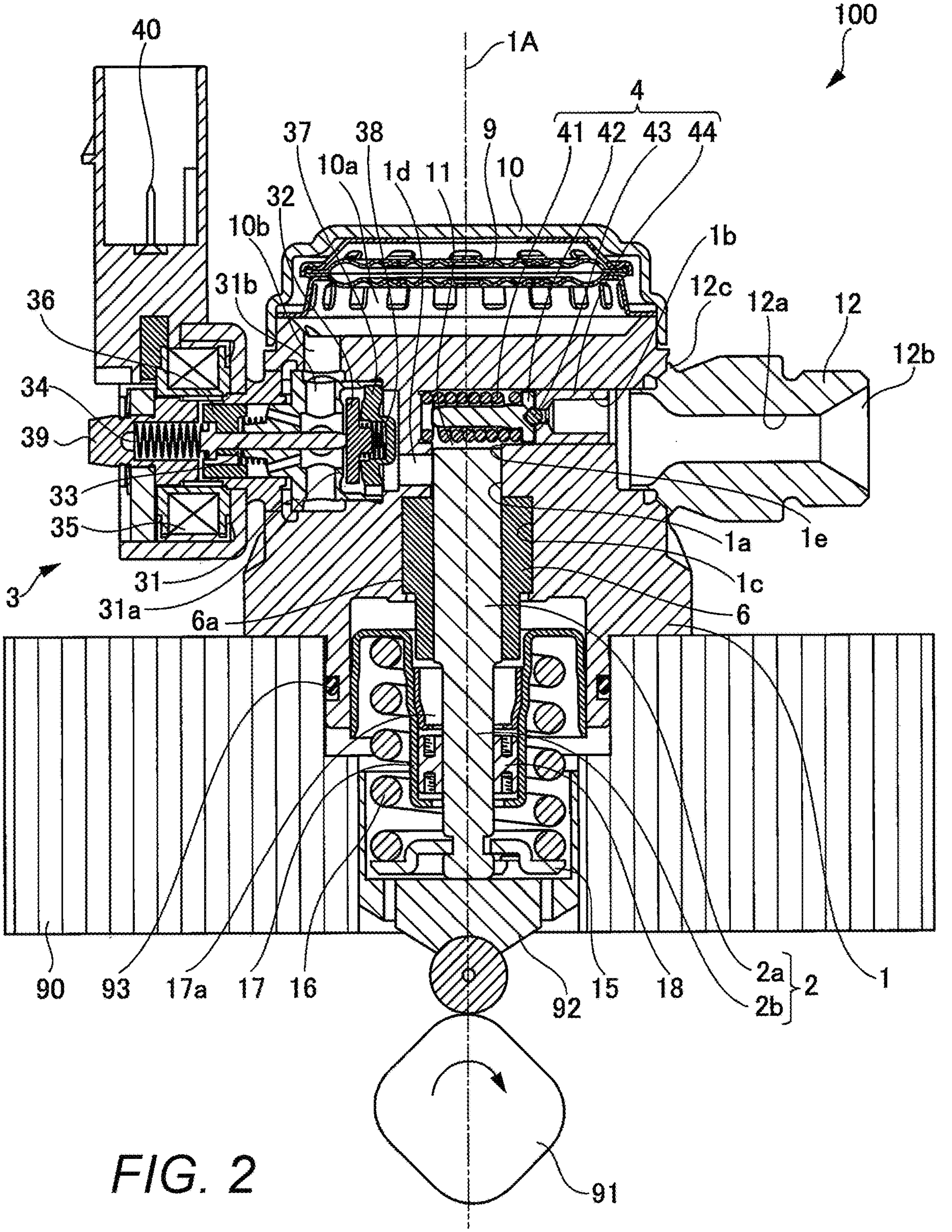
FIG. 2 is a longitudinal cross-sectional view of a high-pressure fuel supply pump taken along the II-II position of FIG. 4.
Figure 3:
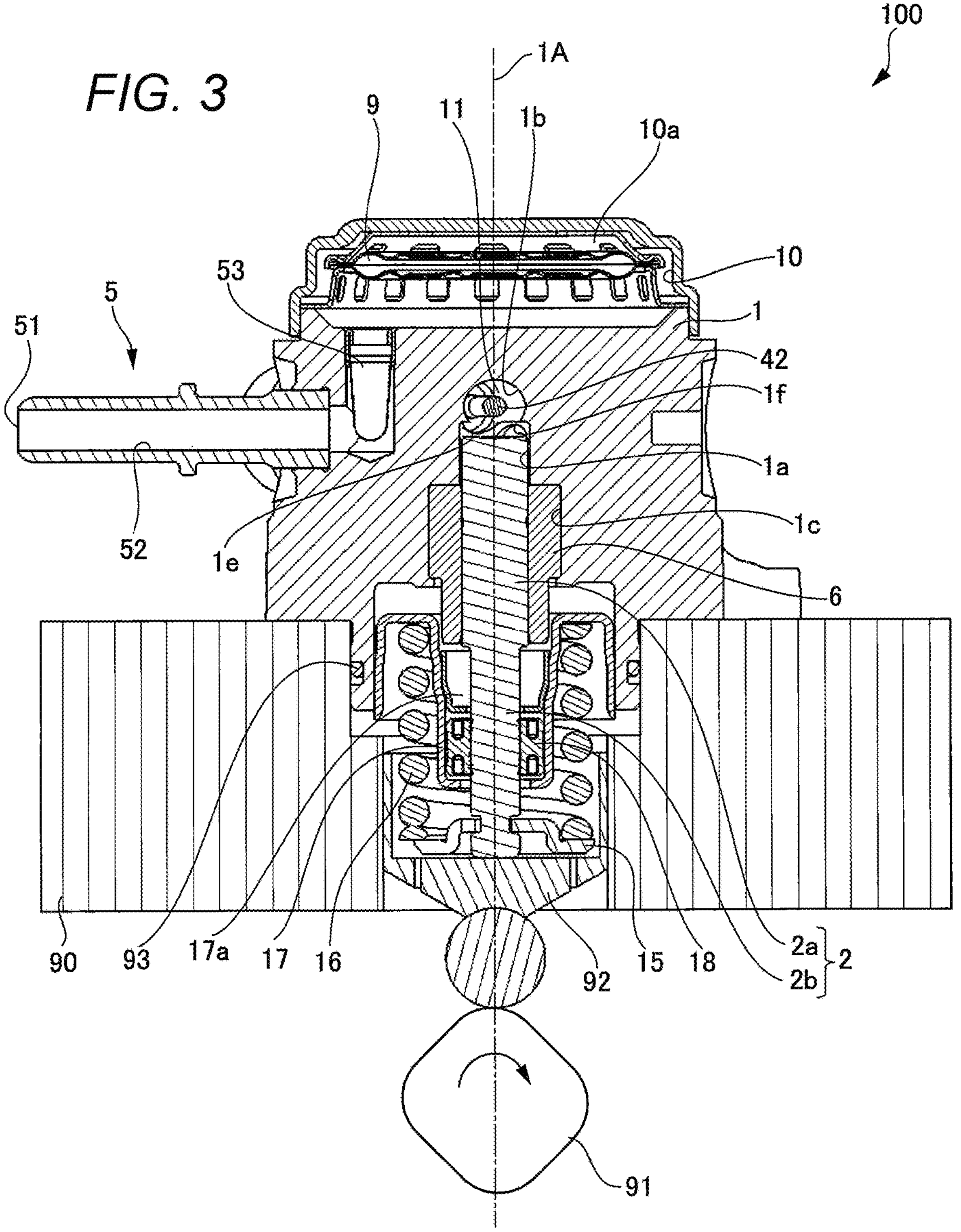
FIG. 3 is a longitudinal cross-sectional view of the high-pressure fuel supply pump taken along the III-III position of FIG. 4.
Figure 4:
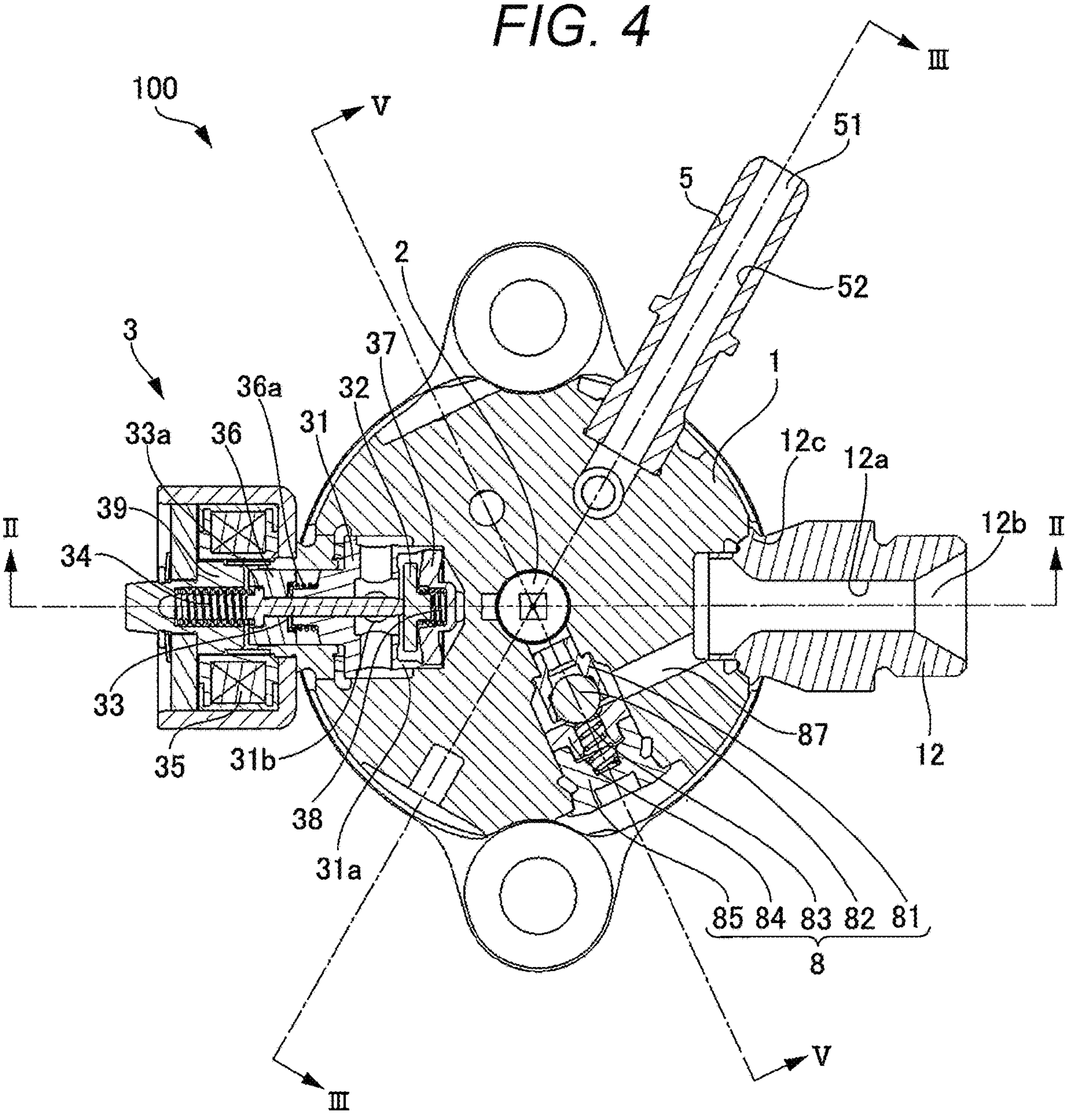
FIG. 4 is a transverse cross-sectional view of the high-pressure fuel supply pump taken parallel to a horizontal plane.
Figure 5:
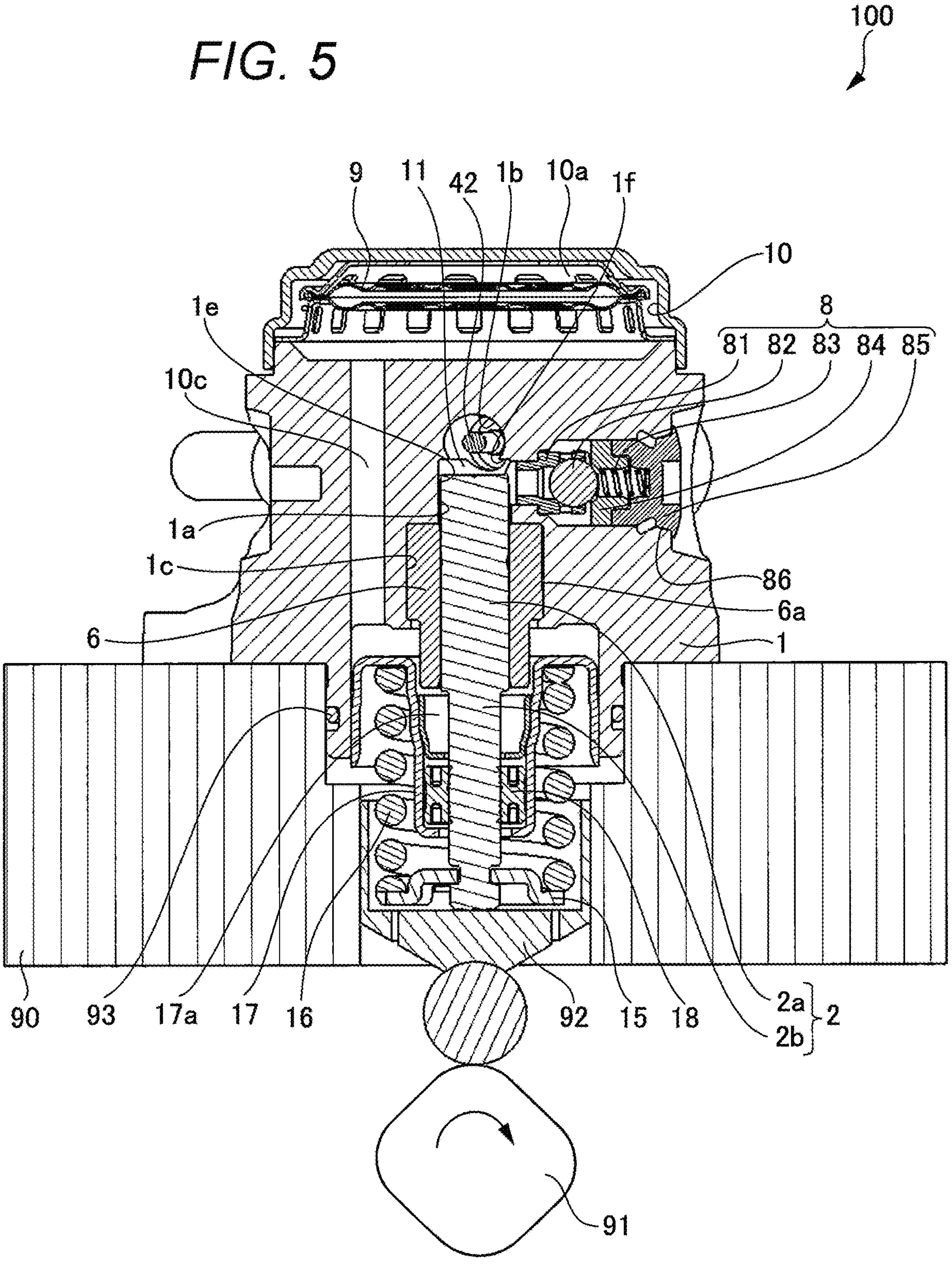
FIG. 5 is a longitudinal cross-sectional view of the high-pressure fuel supply pump taken along the V-V position of FIG. 4.

FIG. 2 is a longitudinal cross-sectional view of the high-pressure fuel supply pump taken along the II-II position of FIG. 4. FIG. 3 is a longitudinal cross-sectional view of the high-pressure fuel supply pump taken along the III-III position of FIG. 4. FIG. 4 is a transverse cross-sectional view of the high-pressure fuel supply pump taken parallel to a horizontal plane. FIG. 5 is a longitudinal cross-sectional view of the high-pressure fuel supply pump taken along the V-V position of FIG. 4.

As illustrated in FIGS. 2 to 5, the pump body 1 of the high-pressure fuel supply pump 100 is formed in a substantially columnar shape. As illustrated in FIGS. 2 and 3, a first chamber 1*a*, a second chamber 1*b*, a third chamber 1*c*, and the intake passage 1*d* (FIG. 2) are provided inside the pump body 1. The pump body 1 is in close contact with a fuel pump attachment portion 90, and is fixed to the fuel pump attachment portion 90 by a plurality of bolts or screws not illustrated. The fuel pump attachment portion 90 is a part attached with the high-pressure fuel supply pump 100.

The first chamber 1*a* is a columnar space portion provided in the pump body 1. A center line 1A of the first chamber 1*a* coincides with the center line of the pump body 1. One end portion of the plunger 2 is inserted into the first chamber 1*a*. The plunger 2 reciprocates in the first chamber 1*a*. The first chamber 1*a* and one end of the plunger 2 form the pressurization chamber 11.

The second chamber 1*b* is a columnar space portion provided in the pump body 1. The diameter of the second chamber 1*b* is smaller than the diameter of the first chamber 1*a*. The center line (not illustrated) of the second chamber 1*b* is orthogonal to the center line 1A of the first chamber 1*a*. The relief valve 4 is disposed in the second chamber 1*b*.

The first chamber 1*a* and the second chamber 1*b* communicate with each other through a communication hole 1*e* having a circular shape. The diameter of the communication hole 1*e* is the same as the diameter of the first chamber 1*a*. The communication hole 1*e* is positioned at one end of the first chamber 1*a*. The diameter of the communication hole 1*e* is larger than the outer diameter of the plunger 2. The center line 1A of the first chamber 1*a* passing through the center of the communication hole 1*e* is orthogonal to the center line of the second chamber 1*b*.

As illustrated in FIGS. 3 and 5, the diameter of the communication hole 1*e* is larger than the diameter of the second chamber 1*b*. The communication hole 1*e* has a tapered surface 1*f*. The diameter of the tapered surface 1*f* gradually decreases toward the second chamber 1*b* in the cross section orthogonal to the center line of the second chamber 1*b*. This allows the fuel having passed through the relief valve 4 to smoothly return to the pressurization chamber 11 along the tapered surface 1*f*.

The third chamber 1*c* is a columnar space portion provided in the pump body 1. The third chamber 1*c* is continuous to the other end of the first chamber 1*a*. The center line of the third chamber 1*c* coincides with the center line 1A of the first chamber 1*a* and the center line of the pump body 1. The diameter of the third chamber 1*c* is larger than the diameter of the first chamber 1*a*. A cylinder 6 that guides reciprocation of the plunger 2 is disposed in the third chamber 1*c*.

The cylinder 6 is formed in a tubular shape. The cylinder 6 is press-fitted into the third chamber 1*c* of the pump body 1 at a press-fitting portion 6*a*. One end of the cylinder 6 is in contact with the top surface of the third chamber 1*c*. The top surface of the third chamber 1*c* is positioned at a step portion between the first chamber 1*a* and the third chamber 1*c*. In the cylinder 6, only the press-fitting portion 6*a* has a press-fitting dimension, and the cylinder diameter on the pressurization chamber 11 side relative to the press-fitting portion 6*a* is set to be smaller than the diameter of the third chamber 1*c*. Therefore, on the pressurization chamber 11 side relative to the press-fitting portion 6*a*, a clearance exists between the outer peripheral surface of the cylinder 6 and the inner peripheral surface of the third chamber 1_c_. The plunger 2 is in slidable contact with the inner peripheral surface of the cylinder 6.

On the other hand, a fitting portion between the fuel pump attachment portion 90 and the pump body 1 is attached with an O-ring 93 as a seat member. The O-ring 93 prevents engine oil from leaking to the outside of the engine (internal combustion engine) through between the fuel pump attachment portion 90 and the pump body 1.

A tappet 92 is disposed at a lower end of the plunger 2. The tappet 92 moves up and down the plunger 2 by converting rotational motion of the cam 91 attached to a cam shaft of the engine into up-down motion. The plunger 2 receives a force of a spring 16 via a retainer 15, and is biased on the cam 91 side by this spring force. The lower end of the plunger 2 is pressed against the tappet 92 by the force of the spring 16. The tappet 92 reciprocates according to the rotation of the cam 91. By reciprocating (moving up and down) in the up-down direction of FIG. 5 integrally with the tappet 92, the plunger 2 changes the volume of the pressurization chamber 11.

A seal holder 17 is disposed between the cylinder 6 and the retainer 15. The seal holder 17 is formed in a tubular shape, and the plunger 2 is inserted into this tubular part. The seal holder 17 forms an auxiliary chamber 17_a_. The seal holder 17 holds a plunger seal 18 at the lower end portion that is on the retainer 15 side. The auxiliary chamber 17_a_ is disposed on the cylinder 6 side relative to the plunger seal 18. The auxiliary chamber 17_a_ is formed from the periphery of a small diameter portion 2_b_ of the plunger 2 to the periphery of a small diameter portion of the cylinder 6.

The plunger seal 18 is in slidable contact with the outer peripheral surface of the small diameter portion 2_b_ of the plunger 2. By sealing the fuel in the auxiliary chamber 17_a_ when the plunger 2 reciprocates, the plunger seal 18 prevents the fuel in the auxiliary chamber 17_a_ from flowing into the engine. The plunger seal 18 prevents lubricating oil (including engine oil) that lubricates a sliding portion in the engine from flowing into the pump body 1.

In FIG. 2, the plunger 2 reciprocates in the up-down direction. When the plunger 2 moves down, the volume of the pressurization chamber 11 increases, and when the plunger 2 moves up, the volume of the pressurization chamber 11 decreases. That is, the plunger 2 is disposed so as to reciprocate in a direction of enlarging and reducing the volume of the pressurization chamber 11.

The plunger 2 has a large diameter portion 2_a_ and the small diameter portion 2_b_. A boundary portion between the large diameter portion 2_a_ and the small diameter portion 2_b_ has a stepped structure. When the plunger 2 reciprocates, the stepped portions of the large diameter portion 2_a_ and the small diameter portion 2_b_ move in the auxiliary chamber 17_a_. Therefore, the volume of the auxiliary chamber 17_a_ increases or decreases by the reciprocation of the plunger 2.

The auxiliary chamber 17_a_ communicates with a low-pressure fuel chamber 10 through a fuel passage 10_c_ (FIGS. 3 and 5). When the plunger 2 moves down, a flow of fuel from the auxiliary chamber 17_a_ toward the low-pressure fuel chamber 10 is generated, and when the plunger 2 moves up, a flow of fuel from the low-pressure fuel chamber 10 toward the auxiliary chamber 17_a_ is generated. This can reduce the fuel flow rate into and out of the pump in the intake stroke or the return stroke of the high-pressure fuel supply pump 100, and can reduce the pressure pulsation generated inside the high-pressure fuel supply pump 100.

As illustrated in FIG. 3, the low-pressure fuel chamber 10 is provided at an upper portion of the pump body 1. An intake joint 5 is attached to a side surface portion of the pump body 1. The intake joint 5 is connected to the low-pressure pipe 104 (FIG. 1). The low-pressure pipe 104 is a pipe through which the fuel supplied from the fuel tank 103 (FIG. 1) passes. The fuel in the fuel tank 103 is supplied to the inside of the pump body 1 through the intake joint 5.

The intake joint 5 includes the low-pressure fuel intake port 51 connected to the low-pressure pipe 104 and an intake flow path 52 communicating with the low-pressure fuel intake port 51. The fuel having passed through the intake flow path 52 passes through an intake filter 53 and is supplied to the low-pressure fuel chamber 10. The intake filter 53 is provided inside the pump body 1. The intake filter 53 removes foreign matters existing in the fuel and prevents foreign matters from entering the high-pressure fuel supply pump 100.

The low-pressure fuel chamber 10 is provided with a low-pressure fuel flow path 10_a_ and an intake passage 10_b_ (FIG. 2). The low-pressure fuel flow path 10_a_ is provided with the pressure pulsation reduction mechanism 9. When the fuel flowing into the pressurization chamber 11 is returned to the intake passage 10_b_ again through the electromagnetic intake valve 3 in an open state, pressure pulsation is generated in the low-pressure fuel chamber 10. The pressure pulsation reduction mechanism 9 reduces spreading of the pressure pulsation generated in the high-pressure fuel supply pump 100 to the low-pressure pipe 104.

The pressure pulsation reduction mechanism 9 includes, for example, a metal diaphragm damper. The metal diaphragm damper has a structure in which two disk-shaped metal plates having a corrugated plate shape are bonded to each other at the outer periphery of each of the disk-shaped metal plates, and an inert gas such as argon is injected into a space formed between the two disk-shaped metal plates. The metal diaphragm damper absorbs or reduces pressure pulsation by expansion and contraction of the space formed between the two disk-shaped metal plates.

The intake passage 10_b_ communicates with the intake port 31_b_ (FIG. 2) of the electromagnetic intake valve 3. The fuel having passed through the low-pressure fuel flow path 10_a_ reaches the intake port 31_b_ of the electromagnetic intake valve 3 through the intake passage 10_b_.

Electromagnetic Intake Valve

Next, the configuration and operation of the electromagnetic intake valve included in the high-pressure fuel supply pump according to the present embodiment will be described.

As illustrated in FIGS. 2 and 4, the electromagnetic intake valve 3 is inserted into a lateral hole formed in the pump body 1. The electromagnetic intake valve 3 includes an intake valve seat 31, the valve portion 32, a rod 33, a rod biasing spring 34, an electromagnetic coil 35, an anchor 36, a stopper 37, a valve biasing spring 38, and an anchor biasing spring 36_a_.

The intake valve seat 31 is press-fitted into the lateral hole of the pump body 1. The intake valve seat 31 is formed in a tubular shape. An inner peripheral portion of the intake valve seat 31 is provided with a seating portion 31_a_. The intake port 31_b_ is formed at the intake valve seat 31. The intake port 31_b_ is formed so as to reach the inner peripheral portion from the outer peripheral portion of the intake valve seat 31. The intake port 31_b_ communicates with the intake passage 10_b_ in the low-pressure fuel chamber 10 described above.

The stopper 37 is disposed in the lateral hole of the pump body 1. The stopper 37 is disposed in a state of facing the seating portion 31*a* of the intake valve seat 31 in the center axis direction of the rod 33. The valve portion 32 is disposed between the stopper 37 and the seating portion 31*a*. The valve biasing spring 38 is disposed between the stopper 37 and the valve portion 32. The valve biasing spring 38 biases the valve portion 32 on the seating portion 31*a* side.

By coming into contact with the seating portion 31*a*, the valve portion 32 closes the communication portion between the intake port 31*b* and the pressurization chamber 11. This brings the electromagnetic intake valve 3 into a closed state. By coming into contact with the stopper 37, the valve portion 32 opens the communication portion between the intake port 31*b* and the pressurization chamber 11. This brings the electromagnetic intake valve 3 into the open state.

The rod 33 penetrates a tubular hole formed in the intake valve seat 31. One end of the rod 33 is in contact with the valve portion 32. The rod biasing spring 34 biases the valve portion 32 on the stopper 37 side via the rod 33, that is, in a direction of opening the electromagnetic intake valve 3. One end of the rod biasing spring 34 is engaged with a flange portion 33*a* formed on the other end side of the rod 33. The other end of the rod biasing spring 34 is engaged with a magnetic core 39. The magnetic core 39 is disposed so as to surround the rod biasing spring 34.

The anchor 36 is disposed in a state of facing an end surface of the magnetic core 39. The anchor 36 is engaged with the flange portion 33*a* of the rod 33 on a side opposite to the one end of the rod biasing member 34 described above. The anchor biasing spring 36*a* biases the anchor 36 so as to press the anchor 36 against the flange portion 33*a* of the rod 33. The electromagnetic coil 35 is disposed around the magnetic core 39. A terminal member 40 is electrically connected to the electromagnetic coil 35. The terminal member 40 is a member for applying a current to the electromagnetic coil 35. The terminal member 40 is provided at a connector 46.

In a state where no current flows through the electromagnetic coil 35, that is, in a non-energized state, the rod 33 is biased in an valve open direction by the rod biasing spring 34, and presses the valve portion 32 in a valve open direction. Therefore, the valve portion 32 is separated from the seating portion 31*a* and comes into contact with the stopper 37, and the electromagnetic intake valve 3 is brought into an open state. That is, the electromagnetic intake valve 3 is a normally open type electromagnetic valve that opens in the non-energized state.

In a state where the electromagnetic intake valve 3 is opened, the fuel in the intake port 31*b* passes through a gap existing between the valve portion 32 and the seating portion 31*a*, and then flows into the pressurization chamber 11 through a plurality of fuel passing holes not illustrated of the stopper 37 and the intake passage 1*d*. In a state where the electromagnetic intake valve 3 is opened, the valve portion 32 comes into contact with the stopper 37, and thus, the position in the valve open direction of the valve portion 32 is regulated. At this time, the gap existing between the valve portion 32 and the seating portion 31*a* is in a movable range of the valve portion 32, and this movable range is a valve opening stroke.

On the other hand, when a current flows through the electromagnetic coil 35 in the non-energized state described above, a magnetic flux is generated inside the anchor 36, a fixed core 304, a first yoke portion 301, a second yoke portion 302, and the magnetic core 39. By this, a magnetic attractive force is generated between the magnetic core 39 and the anchor 36, and the anchor 36 is attracted in a direction of approaching the magnetic core 39, that is, in the valve close direction by the magnetic attractive force. As a result, the anchor 36 moves against the biasing force of the rod biasing spring 34 and comes into contact with the end surface of the magnetic core 39. When the anchor 36 moves in the valve close direction in this manner, the rod 33 moves together with the anchor 36. Therefore, the valve portion 32 is released from the biasing force in the valve open direction, and moves in the valve close direction by the biasing force of the valve biasing spring 38. When the valve portion 32 comes into contact with the seating portion 31*a* of the intake valve seat 31, the electromagnetic intake valve 3 is brought into a closed state.

Discharge Valve

Next, the configuration and operation of the discharge valve included in the high-pressure fuel supply pump according to the present embodiment will be described.

As illustrated in FIGS. 4 and 5, the discharge valve 8 is connected to an outlet side (downstream side) of the pressurization chamber 11. The discharge valve 8 includes a discharge valve seat 81 communicating with the pressurization chamber 11, a valve portion 82 that comes into contact with and separates from the discharge valve seat 81, a discharge valve spring 83 that biases the valve portion 82 toward the discharge valve seat 81, a discharge valve stopper 84 that determines a stroke (moving distance) of the valve portion 82, and a plug 85 that blocks fuel leakage to the outside.

The discharge valve stopper 84 is press-fitted into the plug 85. The plug 85 is joined to the pump body 1 by welding at a weld portion 86. The discharge valve 8 communicates with a discharge valve chamber 87. The discharge valve chamber 87 is opened and closed by the valve portion 82. The discharge valve chamber 87 is formed at the pump body 1.

The pump body 1 is provided with a lateral hole communicating with the second chamber 1*b* (FIG. 2), and a discharge joint 12 is inserted into this lateral hole. The discharge joint 12 is fixed to the pump body 1 by welding at a weld portion 12*c* (FIG. 4). The discharge joint 12 includes the discharge passage 12*a* and a fuel discharge port 12*b*. The discharge passage 12*a* communicates with the lateral hole of the pump body 1 and the discharge valve chamber 87. The fuel discharge port 12*b* is formed at one end of the discharge passage 12*a*. The discharge passage 12*a* communicates with the common rail 106 (FIG. 1) via the fuel discharge port 12*b*.

In the discharge valve 8 configured as described above, the valve portion 82 is pressed against the discharge valve seat 81 by the biasing force of the discharge valve spring 83 in a state where there is no difference in fuel pressure (fuel differential pressure) between the pressurization chamber 11 and the discharge valve chamber 87. Therefore, the discharge valve 8 is brought into a closed state. On the other hand, when the fuel pressure in the pressurization chamber 11 becomes higher than the fuel pressure in the discharge valve chamber 87, the valve portion 82 moves on the discharge valve stopper 84 side against the biasing force of the discharge valve spring 83. This brings the discharge valve 8 into an open state.

When the discharge valve 8 is brought into a closed state, the high-pressure fuel in the pressurization chamber 11 passes through the discharge valve 8 and reaches the discharge valve chamber 87. The fuel having reached the discharge valve chamber 87 passes through the discharge passage 12*a* and the fuel discharge port 12*b* of the discharge joint 12 and is discharged to the common rail 106 (FIG. 1).

The discharge valve 8 functions as a check valve that restricts the flow direction of the fuel by the configuration and operation described above.

Relief Valve

The relief valve 4 illustrated in FIG. 2 is a valve configured so as to operate and return the fuel in the discharge passage 12*a* to the pressurization chamber 11 when a problem occurs in the common rail 106 or a member beyond the common rail 106 and the common rail has a high pressure exceeding a predetermined pressure. The relief valve 4 is disposed at a position higher than the discharge valve 8 (FIG. 5) in the direction in which the plunger 2 reciprocates (up-down direction).

The relief valve 4 includes a relief spring 41, a relief valve holder 42, a valve portion 43, and a seat member 44. The relief valve 4 is inserted from the lateral hole of the pump body 1 into which the discharge joint 12 is inserted, and is disposed in the second chamber 1*b*. One end portion of the relief spring 41 is in contact with one end of the second chamber 1*b* formed in the pump body 1. The other end portion of the relief spring 41 is in contact with a flange portion of the relief valve holder 42. The relief valve holder 42 is engaged with the valve portion 43. The biasing force of the relief spring 41 is applied to the valve portion 43 via the flange portion of the relief valve holder 42.

The valve portion 43 is pressed against the seat member 44 by the biasing force of the relief spring 41. By this, the fuel passage is closed by the valve portion 43 and the seat member 44. Therefore, the relief valve 4 is brought into a closed state. The moving direction of the relief valve holder 42 and the valve portion 43 is orthogonal to the direction in which the plunger 2 reciprocates. The center line of the relief valve holder 42 in the relief valve 4 is orthogonal to the center line of the plunger 2.

The seat member 44 forms a fuel passage in a part facing the valve portion 43. The sheet member 44 is formed in a tubular shape. The internal space of the seat member 44 communicates with the fuel passage. The internal space of the seat member 44 communicates with the discharge passage 12*a* on the side opposite to the valve portion 43. Movement of the fuel between the upstream side of the pressurization chamber 11 and the downstream side of the seat member 44 is blocked by the valve portion 43 coming into (close) contact with the seat member 44 to close the fuel passage.

When the pressure in the common rail 106 or a member beyond the common rail 106 increases, the fuel in the seat member 44 presses the valve portion 43 against the biasing force of the relief spring 41. By this, the valve portion 43 moves in a direction away from the seat member 44. As a result, the relief valve 4 is brought into an open state. When the relief valve 4 is brought into the open state, the fuel in the discharge passage 12*a* returns to the pressurization chamber 11 through the fuel passage formed between the valve portion 43 and the seat member 44. Therefore, the pressure for opening the relief valve 4 is determined by the biasing force of the relief spring 41.

The moving direction of the valve portion 43 in the relief valve 4 is different from the moving direction of the valve portion 82 in the discharge valve 8 described above. Specifically, the moving direction of the valve portion 82 in the discharge valve 8 is a first radial direction of the pump body 1, and the moving direction of the valve portion 43 in the relief valve 4 is a second radial direction different from the first radial direction of the pump body 1. This allows the discharge valve 8 and the relief valve 4 to be disposed at positions not overlapping each other in the up-down direction, and the space inside the pump body 1 to be effectively utilized to downsize the pump body 1.

Operation of High-Pressure Fuel Supply Pump

Next, the operation of the high-pressure fuel supply pump according to the present embodiment will be described with reference to FIGS. 2 and 4. FIG. 2 illustrates a state in which the plunger 2 has moved up to the top dead center.

When the plunger 2 moves down from the state illustrated in FIG. 2 and the electromagnetic intake valve 3 is in the open state, the fuel flows from the intake passage 1*d* into the pressurization chamber 11. Hereinafter, the stroke in which the plunger 2 moves down is called an intake stroke. On the other hand, when the plunger 2 moves up from the bottom dead center and the electromagnetic intake valve 3 is in the closed state, the fuel in the pressurization chamber 11 is pushed by the plunger 2 and boosted. The boosted fuel passes through the discharge valve 8 and is pumped to the common rail 106 (FIG. 1). Hereinafter, the process in which the plunger 2 moves up is called an upward stroke.

As described above, when the electromagnetic intake valve 3 is closed during the upward stroke, the fuel taken into the pressurization chamber 11 in the intake stroke one cycle before is pressurized. At this time, the pressurized fuel is discharged to the common rail 106 side. On the other hand, when the electromagnetic intake valve 3 is opened during the upward process, the fuel in the pressurization chamber 11 is pushed back to the intake passage 1*d* side and is not discharged to the common rail 106 side. In this manner, the fuel discharge by the high-pressure fuel supply pump 100 is operated by opening and closing of the electromagnetic intake valve 3. The opening and closing of the electromagnetic intake valve 3 is controlled by the ECU 101.

In the intake stroke, the volume of the pressurization chamber 11 increases, and the fuel pressure in the pressurization chamber 11 decreases. By this, the fluid differential pressure (hereinafter, called "fluid differential pressure before and after the valve portion 32") between the intake port 31*b* and the pressurization chamber 11 decreases. When the biasing force of the rod biasing spring 34 becomes larger than the fluid differential pressure before and after the valve portion 32, the rod 33 moves in the valve open direction, the valve portion 32 is separated from the seating portion 31*a* of the intake valve seat 31, and the electromagnetic intake valve 3 is brought into an open state.

After the intake stroke is ended, the stroke proceeds to the upward stroke. At this time, the electromagnetic coil 35 is maintained in a non-energized state. Therefore, no magnetic attractive force is generated between the anchor 36 and the magnetic core 39. In this state, a pressing force in the valve open direction and a pressing force in the valve close direction act on the valve portion 32. The pressing force in the valve open direction acting on the valve portion 32 is a pressing force corresponding to a difference between the biasing force of the rod biasing spring 34 and the biasing force of the valve biasing spring 38. The pressing force in the valve close direction acting on the valve portion 32 is a pressing force by a fluid force generated when the fuel flows back from the pressurization chamber 11 to the low-pressure fuel flow path 10*a*.

In this state, in order for the electromagnetic intake valve 3 to maintain the open state, the difference between the biasing force of the rod biasing spring 34 and the biasing force of the valve biasing spring 38 is set to be larger than the above-described fluid force. The volume of the pressurization chamber 11 decreases as the plunger 2 moves up. Therefore, the fuel taken into the pressurization chamber 11 passes through between the valve portion 32 and the seating portion 31*a* again and is returned to the intake port 31*b*. Therefore, the pressure in the pressurization chamber 11 does not increase. This stroke is called a return stroke.

In the return stroke, when the ECU 101 (FIG. 1) gives the electromagnetic intake valve 3 a control signal, a current flows through the electromagnetic coil 35 via the terminal member 40. When a current flows through the electromagnetic coil 35, a magnetic flux is generated around the electromagnetic coil 35. The magnetic flux is mainly generated inside the anchor 36, the fixed core 304, the first yoke portion 301, the second yoke portion 302, and the magnetic core, which are magnetic materials. By this, a magnetic attractive force is generated between the magnetic core 39 and the anchor 36. Therefore, the anchor 36 is attracted to the magnetic core 39. At this time, the rod 33 moves in the valve close direction together with the anchor 36 against the biasing force of the rod biasing spring 34.

When the rod 33 and the anchor 36 move in the valve close direction in this manner, the valve portion 32 is released from the biasing force in the valve open direction. Therefore, the valve portion 32 moves in the valve close direction by the biasing force of the valve biasing spring 38 and the fluid force caused by the fuel flowing into the intake passage 10*b*. Then, when the valve portion 32 comes into contact with (sits on) the seating portion 31*a* of the intake valve seat 31, the electromagnetic intake valve 3 is brought into a closed state.

After the electromagnetic intake valve 3 is brought into the closed state, the fuel in the pressurization chamber 11 is boosted as the plunger 2 moves up. When the pressure of the fuel becomes equal to or greater than a predetermined pressure, the fuel is discharged to the common rail 106 (FIG. 1) through the discharge valve 8. This stroke is called a discharge stroke. The stroke in which the plunger 2 moves from the bottom dead center to the top dead center, that is, the upward stroke includes a return stroke and a discharge stroke. By controlling the timing of energizing the electromagnetic coil 35 of the electromagnetic intake valve 3, the ECU 101 can control the amount of fuel (high-pressure fuel) to be discharged to the common rail 106.

Specifically, when the timing of energizing the electromagnetic coil 35 is advanced, the ratio of the return stroke decreases and the ratio of the discharge stroke increases during the upward stroke. Therefore, the fuel returned to the intake passage 10*b* decreases, and the fuel discharged to the common rail 106 increases. On the other hand, when the timing of energizing the electromagnetic coil 35 is delayed, the ratio of the return stroke increases and the ratio of the discharge stroke decreases during the upward stroke. Therefore, the fuel returned to the intake passage 10*b* increases, and the fuel discharged to the common rail 106 decreases. Therefore, by controlling the timing of energizing the electromagnetic coil 35, the ECU 101 can control the amount of fuel to be discharged to the common rail 106 according to the amount needed by the engine (internal combustion engine).

Electromagnetic Intake Valve

Figure 6:
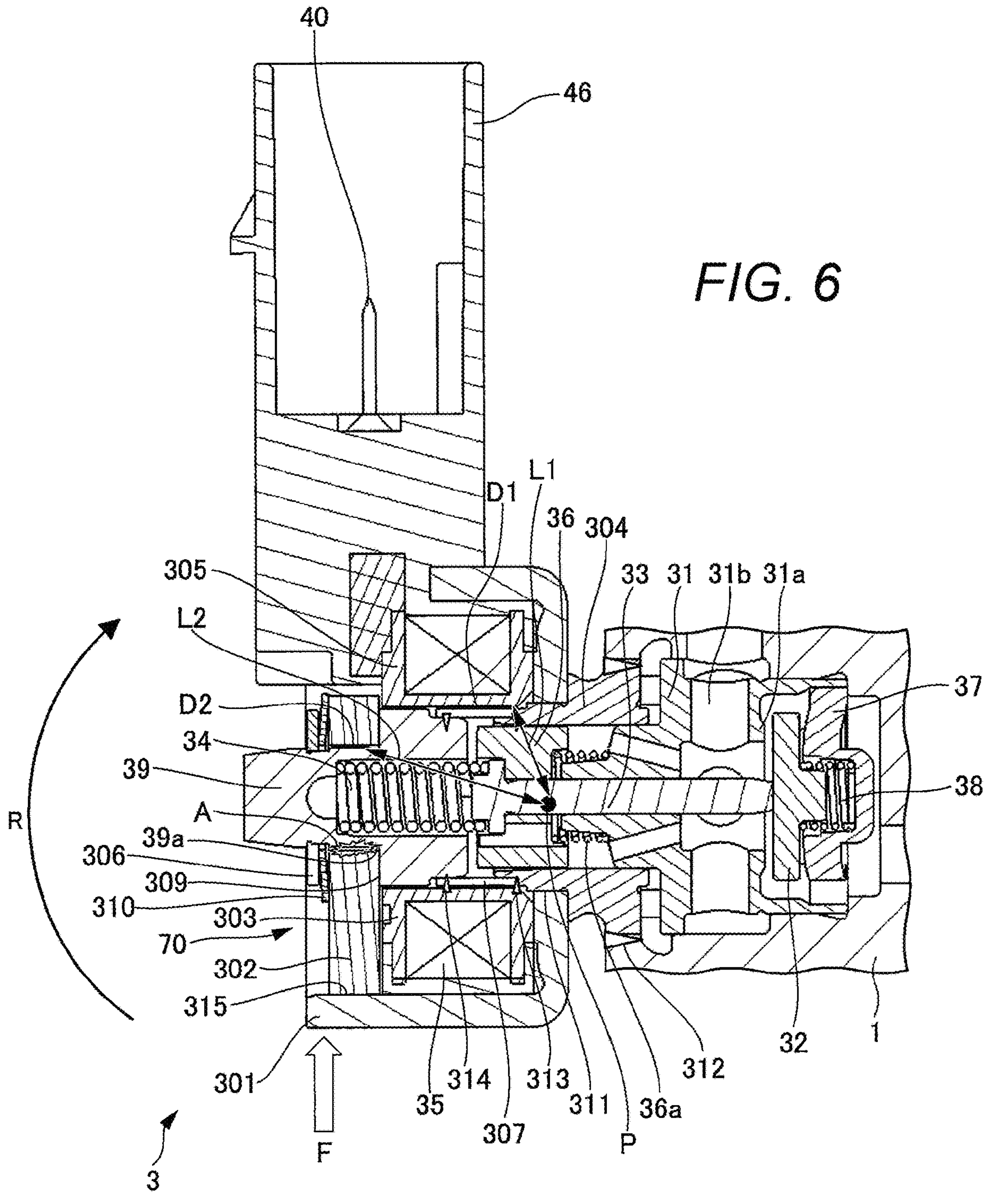
FIG. 6 is a longitudinal cross-sectional view for explaining a configuration of an electromagnetic intake valve according to a comparative embodiment.

FIG. 6 is a longitudinal cross-sectional view for explaining the configuration of an electromagnetic intake valve according to a comparative embodiment. Note that the comparative embodiment has a configuration common to that of the present embodiment except for some configurations.

In FIG. 6, a coil winding portion 60 includes the electromagnetic coil 35 and a bobbin 305. The electromagnetic coil 35 is wound around the bobbin 305 made of resin by aligned winding. The bobbin 305 is disposed in a fixed state inside the first yoke portion 301.

A magnetic circuit configuration portion 70 constitutes a magnetic circuit for passing a magnetic flux when a current flows through the electromagnetic coil 35. The magnetic circuit configuration portion 70 includes the anchor 36, the fixed core 304, the first yoke portion 301, the second yoke portion 302, and the magnetic core 39. The first yoke portion 301 and the second yoke portion 302 are elements constituting a yoke. In the present embodiment, the first yoke portion 301 and the second yoke portion 302 are separated as an example, but they may be integrated. A member constituting the magnetic circuit configuration portion 70 includes a magnetic material.

The first yoke portion 301 is disposed so as to surround the coil winding portion 60. The first yoke portion 301 is press-fitted and fixed to the fixed core 304 by a press-fitting portion 311. The second yoke portion 302 is pressed against the magnetic core 39 by the biasing force of a yoke biasing spring 310. The yoke biasing spring 310 is disposed between the second yoke portion 302 and a spring stopper 306 in the center axis direction of the magnetic core 39. The spring stopper 306 is a stopper that regulates the position of the yoke biasing spring 310. The yoke biasing spring 310 includes a leaf spring as an elastic body. The second yoke portion 302 is held displaceably in the center axis direction of the electromagnetic intake valve 3 by the yoke biasing spring 310. The second yoke portion 302 and the magnetic core 39 are disposed in a state where the surfaces are in contact with each other at a surface contact portion 309. The second yoke portion 302 is held displaceably in the radial direction of the electromagnetic intake valve 3 by the surface contact portion 309.

A clearance 315 that is minute is secured between the outer peripheral surface of the second yoke portion 302 and the inner peripheral surface of the first yoke portion 301. The clearance 315 is set in a range of several μm to several tens of μm, for example, in order to position the first yoke portion 301 and the second yoke portion 302 and to facilitate magnetic flux passing through between the first yoke portion 301 and the second yoke portion 302.

The anchor 36 is supported movably in the center axis direction of the rod 33 by the fixed core 304. The fixed core 304 is fixed to the pump body 1 at a weld portion 312. The magnetic core 39 and the fixed core 304 are coupled by a ring 307 as a coupling member. The ring 307 is a member sealing fuel existing in the electromagnetic intake valve 3. The ring 307 is formed in a cylindrical shape. The ring 307 includes a non-magnetic material so that a magnetic flux easily passes through between the magnetic core 39 and the anchor 36. As the non-magnetic material constituting the ring 307, for example, stainless steel such as SUS304 is conceivable.

The ring 307 is fixed to the fixed core 304 at a weld portion 313 and is fixed to the magnetic core 39 at a weld portion 314. More specifically, one end side in the center axis direction of the ring 307 is fitted to the fixed core 304, and the ring 307 and the fixed core 304 are fixed by welding at the weld portion 313 positioned at this fitting part. The other end side in the center axis direction of the ring 307 is fitted to the magnetic core 39, and the ring 307 and the magnetic core 39 are fixed by welding at the weld portion 314 positioned at this fitting part.

The ring 307 is disposed in a state of facing the coil winding portion 60 across a gap D1 (*mm*) in the radial direction of the electromagnetic intake valve 3. Thus, the ring 307 corresponds to the predetermined part. The radial direction of the electromagnetic intake valve 3 is a direction orthogonal to the center axis of the rod 33. The gap D1 is formed by the bobbin 305. More specifically, the gap D1 is secured between the inner peripheral surface of the bobbin 305 and the outer peripheral surface of a ring 307 facing this. The gap D1 corresponds to a first gap.

On the other hand, the second yoke portion 302 and the magnetic core 39 form a gap D2 (*mm*) in the radial direction of the electromagnetic intake valve 3. More specifically, the gap D2 is secured between the inner peripheral surface of the second yoke portion 302 and the outer peripheral surface of the magnetic core 39 facing this. The gap D2 is a gap formed in a part where the inner peripheral surface of the second yoke portion 302 and the outer peripheral surface of the magnetic core 39 are parallel and close to each other, and is not a gap formed by a thin portion 39*a* of the magnetic core 39. The gap D2 corresponds to a second gap. While the dimension of the clearance 315 described above is on the order of μm, the dimensions of the gaps D1 and D2 are on the order of magnitude different from the clearance 315, that is, on the order of mm.

When a traffic accident or the like involving a collision of an automobile or the like occurs, the bobbin 305 of the coil winding portion 60 or the first yoke portion 301 of the magnetic circuit configuration portion 70 may be applied with an impact force (impact load) directed from the outside to the inside in the radial direction of the electromagnetic intake valve 3. FIG. 6 assumes a case where the first yoke portion 301 is applied with an impact force F, as an example. In this case, depending on the magnitude of the impact force F, it is no longer possible to withstand only with the press-fitting force of the press-fitting portion 311. Then, not only the first yoke portion 301 receiving the impact force F but also the bobbin 305 fixed to the first yoke portion 301 and the electromagnetic coil 35 wound around the bobbin 305 rotate in an R direction about a P position in FIG. 6. In the present description, the "P position" is also called a "rotation center P". The rotation center P exists at the center of a fitting hole of the first yoke portion 301 fitted to the fixed core 304 in the press-fitting portion 311.

In FIG. 6, L1 (*mm*) is a distance from the rotation center P to the gap D1, and L2 (*mm*) is a distance from the rotation center P to the gap D2. The reference position of the gap D1 defining the distance L1 exists at the end portion of the gap D1 closest to the rotation center P in the center axis direction of the ring 307. The reference position of the gap D2 defining the distance L2 exists at the end portion of the gap D2 closest to the rotation center P in the center axis direction of the magnetic core 39. The center axis direction of the ring 307 and the center axis direction of the magnetic core 39 coincide with the center axis direction of the electromagnetic intake valve 3 in a state of being not applied with the impact force F. As seen from FIG. 6, the gap D2 is formed at a position farther than the gap D1 as viewed from the rotation center P.

In the comparative embodiment illustrated in FIG. 6, a value in which the gap D1 is divided by the distance L1 and a value in which the gap D2 is divided by the distance L2 satisfy the relationship (condition) of the following expression (1).

$$D2/L2 < D1/L1 \quad (1)$$

Therefore, when the impact force F as described above is applied to the first yoke portion 301, the second yoke portion 302 and the magnetic core 39 come into contact with each other at an A portion before the bobbin 305 and the ring 307 come into contact with each other. By this, a moment about the rotation center P is generated in the weld portions 312, 313, and 314 and the thin portion 39*a* of the magnetic core 39. When this moment becomes equal to or greater than an allowable value, the weld portions 312, 313, and 314 or the thin portion 39*a* of the magnetic core 39 may be damaged, and the fuel in the electromagnetic intake valve 3 may leak.

Figure 7:
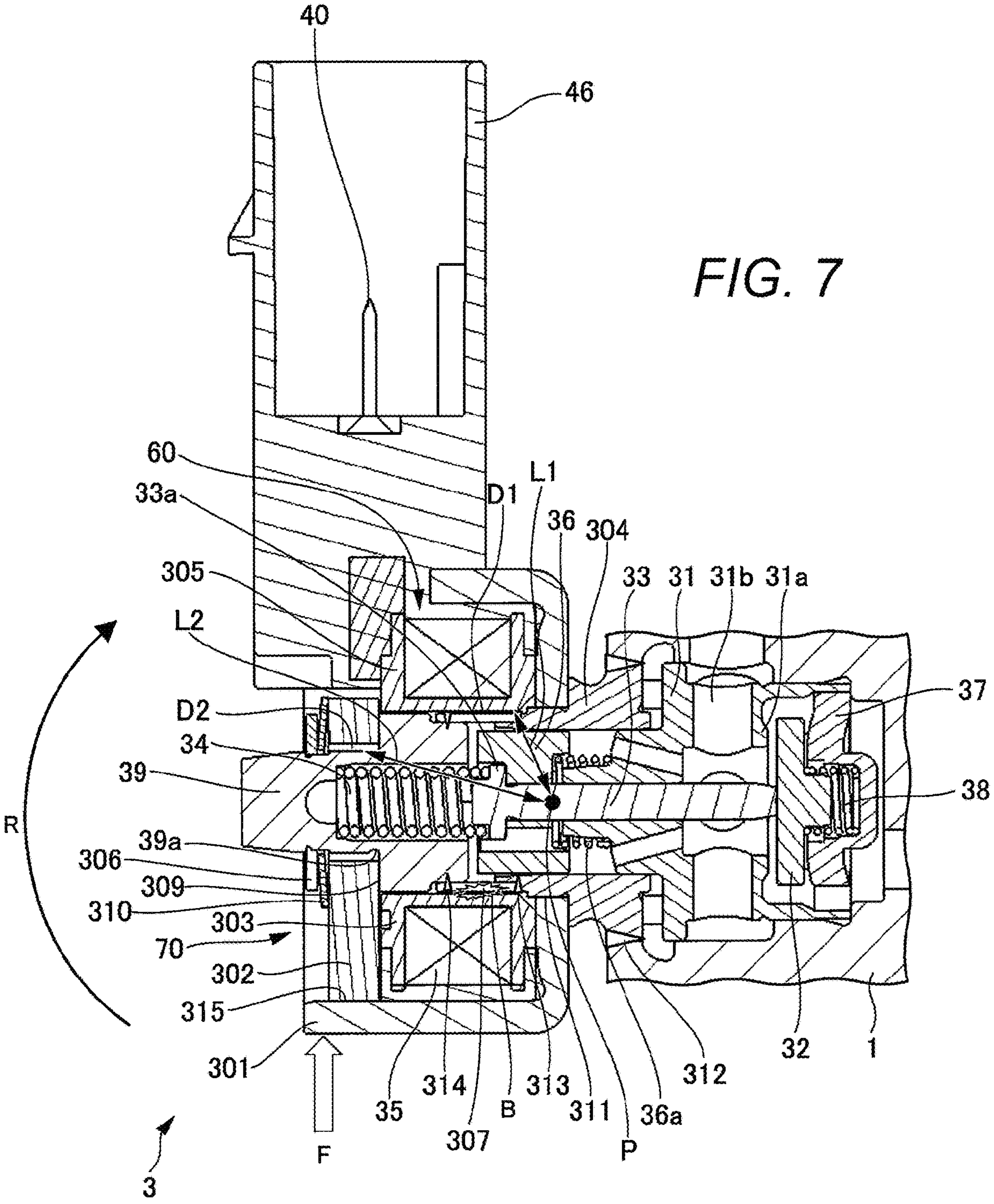
FIG. 7 is a longitudinal cross-sectional view for explaining a configuration of an electromagnetic intake valve according to an embodiment.

Therefore, as illustrated in FIG. 7, the present embodiment adopts a configuration in which a value in which the gap D1 is divided by the distance L1 and a value in which the gap D2 is divided by the distance L2 satisfy the relationship (condition) of the following expression (2). Note that the configuration of the electromagnetic intake valve according to the present embodiment is basically similar to the configuration of the electromagnetic intake valve according to the comparative embodiment except for the difference between the above expression (1) and the following expression (2).

$$D2/L2 > D1/L1 \quad (2)$$

In the present embodiment, as can be understood from the above expression (2), the dimensions of the gaps D1 and D2 are set such that the longer the distances L1 and L2 from the rotation center P to the gaps D1 and D2 are, the larger the dimensions of the gaps D1 and D2 are. By this, the gap D1 formed at a part where the distance L1 to the rotation center P is short becomes relatively narrow, and the gap D2 formed at a part where the distance L2 to the rotation center P is long becomes relatively wide. That is, the gaps D1 and D2 are set to have larger dimensions as they are far from the rotation center P. Therefore, when the impact force F described above is applied to the first yoke portion 301, the coil winding portion 60 and the ring 307 come into contact with each other first. At this time, the coil winding portion 60 and the ring 307 come into contact with each other at a B portion. A part in contact with the ring 307 is the bobbin 305. The "first" described here means "prior to other parts" in a broad sense, and means "at least before the second yoke portion 302 and the magnetic core 39 come into contact with each other" in a narrow sense. However, by adopting a configuration satisfying the relationship of the above expression (2), even when the impact force F described above is applied to the first yoke portion 301, it is possible to avoid contact between the second yoke portion 302 and the magnetic core 39.

As described above, in the present embodiment, the dimension of the gap D1 formed between the coil winding portion 60 and the ring 307 is set such that the coil winding portion 60 and the ring 307 come into contact with each other first when the impact force F directed from the outside to the inside in the radial direction of the electromagnetic intake valve 3 is applied to the first yoke portion 301 (or the coil winding portion 60). This can make the moment acting on the weld portions 312, 313, and 314 about the rotation center P smaller than that in the comparative embodiment described above. Specifically, according to the present embodiment, the moment acting on the weld portions 312, 313, and 314 can be reduced to L1/L2 times as compared with the case of the comparative embodiment. In the present embodiment, since the impact force F applied to the first yoke portion 301 is received by the ring 307, no moment is generated in the thin portion 39*a* of the magnetic core 39. Therefore, even when an unexpected impact force is applied to the coil winding portion 60 and the magnetic circuit configuration portion 70 due to a traffic accident or the like, damage to the components of the electromagnetic intake valve 3 can be effectively suppressed. As a result, it is possible to prevent occurrence of fuel leakage due to breakage of the components of the electromagnetic intake valve 3 and to achieve the high-pressure fuel supply pump 100 with higher safety.

In the present embodiment, the gap D1 is formed by the bobbin 305. The bobbin 305 is made of resin. Therefore, when the bobbin 305 comes into contact with the ring 307 by the impact force F, the impact can be absorbed by deformation of the resin constituting the bobbin 305, and the moment described above can be reduced.

In the present embodiment, D1, which is the first gap, D2, which is the second gap, L1, which is the distance from the rotation center P to the first gap, and L2, which is the distance from the rotation center P to the second gap, are configured to satisfy the relationship of "D2/L2>D1/L1". This can bring the bobbin 305 and the ring 307 into contact with each other before the second yoke portion 302 and the magnetic core 39 come into contact with each other or without bringing the second yoke portion 302 and the magnetic core 39 into contact with each other. Therefore, it is possible to suppress the moment acting on the weld portions 312, 313, and 314 described above and the moment acting on the thin portion 39*a* of the magnetic core 39 to be small and to suppress breakage of the components of the electromagnetic intake valve 3.

In the present embodiment, the second yoke portion 302 is held displaceably in the radial direction of the electromagnetic intake valve 3 and the center axis direction of the electromagnetic intake valve 3. By this, when the first yoke portion 301 is applied with the impact force F, the second yoke portion 302 is pushed by the first yoke portion 301 and displaced as appropriate. Therefore, it is possible to avoid the impact from being transmitted to the magnetic core 39.

In the present embodiment, the coupling member coupling the fixed core 304 and the magnetic core 39 includes the ring 307 including a non-magnetic material. By this, when the electromagnetic coil 35 is energized, a magnetic flux can be efficiently passed through between the anchor 36 and the magnetic core 39, and a strong magnetic attractive force can be generated between them.

Note that the present invention is not limited to the above-described embodiment, and includes various modifications. For example, in the above-described embodiment, the content of the present invention is described in detail for easy understanding, but the present invention is not necessarily limited to one including all the configurations described in the above-described embodiment. A part of the configuration of a certain embodiment can be replaced with the configuration of another embodiment. It is also possible to add the configuration of another embodiment to the configuration of a certain embodiment. A part of the configuration of each embodiment can be deleted, added with another configuration, or replaced with another configuration.

For example, the embodiment described above adopts the configuration in which the fixed core 304 and the magnetic core 39 are coupled by the ring 307 as the coupling member, but the present invention is not limited to this. For example, although not illustrated, a configuration in which a part of the fixed core 304 is extended to a position overlapping the magnetic core 39, an extended core part is fitted to the magnetic core 39, and the core part is fixed to the magnetic core 39 by welding or the like, that is, a configuration not provided with the coupling member may be adopted. When this configuration is adopted, the fixed core 304 facing the bobbin 305 of the coil winding portion 60 across the gap D1 corresponds to the predetermined part. In a case where the ring 307 is provided as a coupling member and the ring 307 is made of stainless steel, mechanical strength when an impact force is received can be enhanced, and therefore it is more preferable.

REFERENCE SIGNS LIST

1 pump body
3 electromagnetic intake valve
35 electromagnetic coil
39 magnetic core
60 coil winding portion
70 magnetic circuit configuration portion
100 high-pressure fuel supply pump (fuel pump)
301 first yoke portion (yoke)
302 second yoke portion (yoke)
304 fixed core
305 bobbin
307 ring (coupling member, predetermined part)
D1 gap (first gap)
D2 gap (second gap)
F impact force
L1 distance (first distance)
L2 distance (second distance)
P rotation center

The invention claimed is:

1. A fuel pump comprising
an electromagnetic intake valve including
a coil winding portion formed by winding an electromagnetic coil around a bobbin, and
a magnetic circuit configuration portion constituting a magnetic circuit when a current flows through the electromagnetic coil, wherein
the magnetic circuit configuration portion includes a yoke disposed so as to surround the coil winding portion, and a predetermined part facing, across a gap, the coil winding portion in a radial direction of the electromagnetic intake valve, and
a dimension of the gap is set such that the coil winding portion and the predetermined part come into contact with each other first when an impact force directed from an outer side to an inner side in the radial direction of the electromagnetic intake valve is applied to the yoke or the coil winding portion, wherein
a first gap is formed as the gap between the coil winding portion and the predetermined part,
the magnetic circuit configuration portion includes the yoke and a magnetic core that form a second gap in the radial direction of the electromagnetic intake valve,
the second gap is formed at a position farther than the first gap as viewed from a rotation center around which the yoke or the coil winding portion rotates when the yoke or the coil winding portion is applied with the impact force, and a relationship of $$D2/L2 > D1/L1$$

is satisfied where the first gap is D1, the second gap is D2, a distance from the rotation center to the first gap is L1, and a distance from the rotation center to the second gap is L2.

2. The fuel pump according to claim 1, wherein the gap is formed by the bobbin.

3. The fuel pump according to claim 1, wherein a part of the yoke is held displaceably in the radial direction of the electromagnetic intake valve and a center axis direction of the electromagnetic intake valve.

4. The fuel pump according to claim 1, wherein the magnetic circuit configuration portion includes a fixed core fixed to a pump body, the predetermined part is formed of a coupling member coupling the fixed core and the magnetic core, and the coupling member includes a non-magnetic material.

5. The fuel pump according to claim 4, wherein the coupling member includes stainless steel.

* * * * *